United States Patent
Iltus

(10) Patent No.: US 9,538,134 B2
(45) Date of Patent: Jan. 3, 2017

(54) METHOD AND SYSTEM FOR RESOURCE LOAD BALANCING IN A CONFERENCING SESSION

(71) Applicant: Vonage Business Inc., Atlanta, GA (US)

(72) Inventor: Saji Iltus, Hadera (IL)

(73) Assignee: Vonage Business Inc., Atlanta, GA (US)

( * ) Notice: Subject to any disclaimer, the term of this patent is extended or adjusted under 35 U.S.C. 154(b) by 0 days.

(21) Appl. No.: 14/138,757

(22) Filed: Dec. 23, 2013

(65) Prior Publication Data

US 2015/0181165 A1    Jun. 25, 2015

(51) Int. Cl.
*H04N 7/15*    (2006.01)

(52) U.S. Cl.
CPC .......................... *H04N 7/15* (2013.01)

(58) Field of Classification Search
CPC ............ H04N 7/15; H04N 7/152; H04N 7/14; H04N 7/142
USPC ....... 348/14.01–14.16; 370/352; 379/202.01; 709/204
See application file for complete search history.

(56) References Cited

U.S. PATENT DOCUMENTS

| | | | |
|---|---|---|---|
| 8,289,368 B2 | 10/2012 | Gopal et al. | |
| 8,395,654 B2 * | 3/2013 | Setlur | H04L 12/1827 348/14.08 |
| 2007/0041366 A1 * | 2/2007 | Vugenfirer | H04M 3/561 370/352 |
| 2010/0241721 A1 * | 9/2010 | Cha | 709/206 |
| 2011/0149810 A1 | 6/2011 | Koren et al. | |
| 2013/0088564 A1 | 4/2013 | Hillier et al. | |

OTHER PUBLICATIONS

Cheung, et al., A Novel Implementation of Very Large Teleconferences; in proceedings of Principles, Systems and Applications of IP Telecommunications, Fourth International Conference; Munich, Germany, Aug. 2-4, 2010; pp. 89-95.

* cited by examiner

*Primary Examiner* — Melur Ramakrishnaiah
(74) *Attorney, Agent, or Firm* — Moser Taboada; Joseph Pagnotta

(57) ABSTRACT

Methods and systems for resource load balancing of teleconference and video conference sessions are provided herein. In some embodiments, a method for resource load balancing of a teleconference session including a plurality of participant devices may include assigning each of the plurality of participant devices into one of a plurality of groups of participant devices based on at least one first heuristic, designating a leader device for each group of participant devices, based on at least one second heuristic to coordinate the teleconference session communications, and coordinating the teleconference session communications of each leader device to facilitate the teleconference session among the plurality of participant devices.

19 Claims, 7 Drawing Sheets

METHOD AND SYSTEM FOR RESOURCE LOAD BALANCING IN A CONFERENCING SESSION

BACKGROUND

Field

Embodiments of the present invention generally relate to conferencing, and specifically, to methods and systems for resource load balancing in a conferencing session.

Description of the Related Art

Conventional methods for teleconferencing and video conferencing rely on either a central manager or peer-to-peer configuration. In a central manager configuration, all participant devices connect to a conference server or host central server that manages all media mixing and signal transmission between the participant devices. However, with the central configuration, if the host server goes offline, the conference session is ended. In addition, the host server takes on the entire processing load of conference data from the participant devices (limiting scalability) and must synchronize all participant devices. Furthermore, synchronization becomes more difficult as more participant devices are added.

In a peer-to-peer configuration, all participant devices are interconnected to one another. Each participant device may essentially maintain separate one on one connections to the other participant devices. However, similar to the central manager configuration, the peer-to-peer configuration is also not very scalable, as each participant device has to handle multiple concurrent connections.

What is needed is a method and system that efficiently manages data communication resource loads of participant devices in a conference session as well as provides system redundancy.

SUMMARY

Embodiments of the present invention generally relate to a method and system for resource load balancing by grouping participant devices and designating leader devices among follower devices. The dynamic grouping through the leader and follower device topology allows for client-side handling of resource load balancing.

In some embodiments, a method for resource load balancing of a teleconference session including a plurality of participant devices may include assigning each of the plurality of participant devices into one of a plurality of groups of participant devices based on at least one first heuristic, designating a leader device for each group of participant devices, based on at least one second heuristic to coordinate the teleconference session communications, and coordinating the teleconference session communications of each leader device to facilitate the teleconference session among the plurality of participant devices.

In some embodiments, a method for resource load balancing in a conferencing platform includes detecting a plurality of participant devices in a conference session is provided herein. The method further designates each of the plurality of participant devices as one of a leader device or a follower device based on at least one first heuristic and assigns each of the follower devices into one of a plurality of groups based on at least one second heuristic, and assigning a leader device to each group of follower devices. The method also coordinating for each group, the teleconference session communications of all participant devices in the group and from each leader device of other groups to facilitate the teleconference session among the plurality of participant devices.

In some embodiments, a system for resource load balancing of a teleconference session including a plurality of participant devices is provided herein. The system may include at least one processor, at least one input device coupled to at least one network, and at least one storage device storing processor executable instructions, which, when executed by the at least one processor, performs a method. The method may include assigning each of the plurality of participant devices into one of a plurality of groups of participant devices based on at least one first heuristic. The method further designates for each group of participant devices, a leader device based on at least one second heuristic to coordinate the teleconference session communications. The method also coordinates the teleconference session communications of each leader device to facilitate the teleconference session among the plurality of participant devices.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
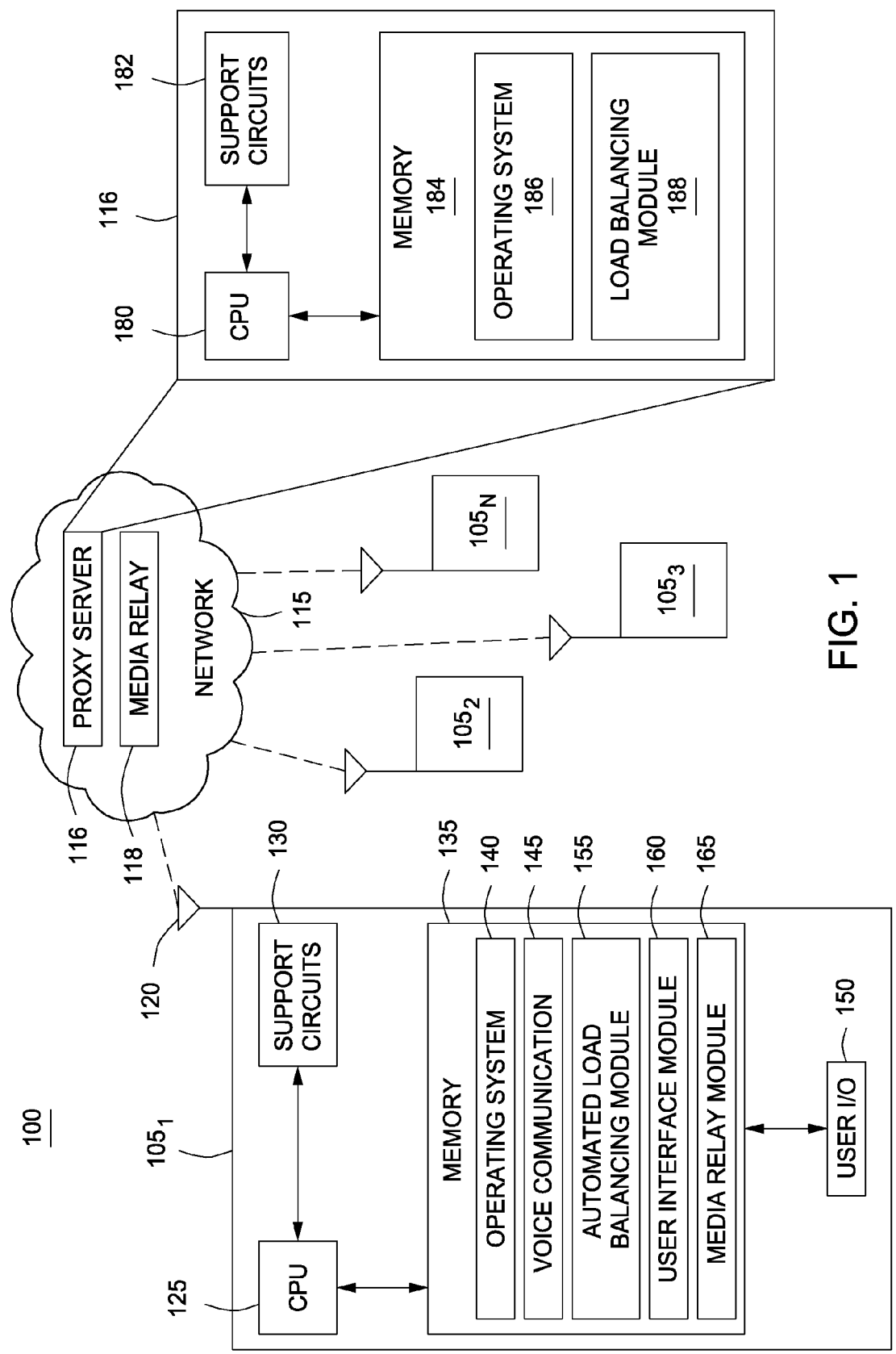
FIG. 1 is an exemplary diagram of a participant user device in accordance to one or more embodiments of the present invention.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to a method, apparatus and system for resource load balancing by grouping participant devices and designating leader devices among follower devices.

While the embodiments discussed herein may include devices using mobile communications, additional embodiments include fixed electronic devices (e.g., desktop computers and corded phones). One non-limiting form of mobile communications that may be used with embodiments described herein is Voice over IP (VoIP), which is utilized to establish and provide voice communications over a data network using the Internet Protocol (IP). Businesses and individuals implement VoIP by installing the necessary equipment and service (i.e., a "high speed" network or broadband connection) to access a VoIP service provider and activating this telecommunication service. Calls from a VoIP subscriber device to a destination device may be routed via a number of inter-connected networks, such as via a VoIP service provider network, mobile telephone service provider networks (e.g., 3G, Long Term Evolution (LTE)), and existing and traditional telecommunications systems that is more commonly referred to as the Public Switched Telephone Network (PSTN) or Plain Old Telephone Service (POTS).

VoIP service providers may provide mobile or desktop VoIP applications (apps) that users can install on their smartphone or other type of mobile or stationary computing devices, or may provide VoIP Telephone/Device Adaptors (TA) that can be used with traditional hardwire telephones. Such apps also include over the top (OTT) applications. OTT applications describe a category of applications or service that provides a product/service over the Internet and bypasses traditional distribution.

At least a portion of the call may be transmitted as packets over an IP network, via Wi-Fi for example, rather than over traditional channels (e.g., the voice channel on a 2G or 3G network, or the like). By transmitting voice as packet data over an IP network, these mobile apps can allow a user to make calls to another OTT client or an off-net destination. They may be used when the user is connected to a base station over the mobile operator's cell network, over a third-party's Wi-Fi access point, over WIMAX, and the like.

In the following description, the terms "leader device" and "follower device" describe a grouping of participant devices (e.g., end-user devices) based on at least one heuristic such that the follower devices are associated with an assigned leader device. A follower device merely receives a conference stream (e.g., audio and/or video data from other participant devices) provides a video or audio stream. A leader device is a designated participant device that performs data processing for the conference session in addition to performing as a follower device. The leader device handles at least a portion of the data processing and mixing for the telecommunication conference session. Mixing for audio may include combining all sources into one output stream. Mixing video streams may require mapping inputs to a fixed-size output or parallel streaming of all sources side by side for all recipient devices in the conference session. Further video mixing may also crop video streams from participant devices.

In some embodiments, the role of a participant device is determined by an external server (e.g., a proxy server) using at least one heuristic after establishing a conference session. In other embodiments, each participant device self-identifies by broadcasting device properties, such that based on at least one heuristic (e.g., highest available bandwidth) as compared to other devices, assumes a leader role as opposed to a follower role. As will be discussed further below, leader devices are devices determined to likely be the most stable with the likelihood of the greatest "up time" to support the conference session. Thus, one heuristic for a leader device is having an AC outlet power connection since there is no likelihood of a battery failure that would otherwise drop the leader device from the conference session. In addition, leader devices may be designated as such based on the resources available to that device. For example, in some embodiments, leader devices may include a dedicated power source or fixed-line connection to the Internet to ensure greater stability of the conference session over a mobile device. Resources may include internal computing resources (e.g., processor type, processing power, stability, grid tied power, memory, and the like) as well as external resources (e.g., bandwidth allocation, connection type, latency, and the like).

In some embodiments, the device designated as the leader device may be dynamically switched to another participant device based on available resources to each device. For example, if the bandwidth available to leader device is reduced, or if another participant device is determined to have a higher bandwidth, the participant device having the higher bandwidth may be dynamically re-designated as the leader device. The previous leader device subsequently switches to a follower device role. In another example, if a conference session consists entirely of mobile phones on the same network and/or region, a participant device that is subsequently plugged into an AC power outlet may be designated as a leader device. The rationale is that the plugged in device has a more stable/reliable power source than other participant devices operating on a battery. Operational conditions and device types may be determined by operating system type as well as various application programming interfaces (APIs).

FIG. 1 is an exemplary diagram of participant user devices $105_{1-N}$ in accordance to one or more embodiments of the present invention. The participant user devices $105_{1-N}$ are in a communication system 100 that allows them to communicate with each other. Participant devices $105_{1-N}$ are coupled via the communications network 115. The connection between participant user devices $105_{1-N}$ and network 115 may be wired or wireless. In some embodiments, the network 115 initially is setup using session initiation protocol (SIP) via the proxy server 116 and media relay 118. Specifically, in some embodiments, the proxy server 116 may communicate with each participant user device $105_{1-N}$ using SIP signaling. After the proxy server 116 negotiates and establishes a connection with each participant user device $105_{1-N}$, the media relay 118 coordinates and sends communication data packets via data streams between participant user devices $105_{1-N}$. The specific details and functionality of SIP can be found in the Internet Engineering Task Force (IETF) Request for Comments (RFC) Paper No. 3261 entitled, "SIP: Session Initiation Protocol" herein incorporated in its entirety by reference. SIP establishes and negotiates a session, including the modification or termination of a session. SIP uses a location-independent address system feature in which called parties can be reached based on a party's name. SIP supports name mapping and redirection allowing users to initiate and receive communication from any location. The communication identifier may be a phone number associated with one or a plurality of devices used by, or otherwise associated with, the user.

The proxy server 116 includes one or more CPUs 180, support circuits 182, and memory 184. The memory 184 includes an operating system 186 and load balancing module 188 (discussed below in further detail). The operating system 186 controls the interoperability of the support circuits 182, CPU 180 and memory 184.

The CPU 180 may comprise one or more commercially available microprocessors or microcontrollers that facilitate data processing and storage. The various support circuits 182 facilitate the operation of the CPU 180 and include one or more clock circuits, power supplies, cache, input/output circuits, and the like. The memory 184 comprises at least one of Read Only Memory (ROM), Random Access Memory (RAM), disk drive storage, optical storage, removable storage and/or the like.

The operating system (OS) 186 generally manages various computer resources (e.g., network resources, file processors, and/or the like). The operating system 186 is configured to execute operations on one or more hardware and/or software modules, such as Network Interface Cards (NICs), hard disks, virtualization layers, firewalls and/or the like. Examples of the operating system 186 may include, but are not limited to, LINUX, CITRIX, MAC OSX, BSD, UNIX, MICROSOFT WINDOWS, IOS, ANDROID and the like.

The communications network 115 may be one or more networks such as Internet Protocol (IP) networks or public switched telephone networks (PSTN) used to connect the participant devices $105_{1-N}$. The participant devices $105_{1-N}$ may be electronic user devices (e.g., telephones, personal computers, laptops, smart phones, mobile phones, tablets, smart TVs, and the like).

The communications network 115 allows for participant devices (wired or wireless) to exchange data and voice communications. Since video or images captured by the camera are digitized for sending across the network 115, video calls are a form of data communication. The communications network 115 is capable of processing the sending and receiving of both and voice and data streams between the participant devices $105_{1-N}$. An exemplary first participant device $105_1$ includes an antenna 120, a CPU 125, support circuits 130, memory 135, input/output (I/O) interface 150, and in some embodiments, a camera (not shown). The support circuits 130 include circuits for interfacing the CPU 125 and memory 135 with the antenna 120 and input/output interface 150. The I/O interface 150 may include a speaker, microphone, additional camera optics, touch screen, buttons and the like for a user to interact with the first participant device $105_1$.

The memory 135 includes an operating system 140, a communication module 145, an automated load balancing module 155, a user interface module 160, and a media relay module 165. The operating system 140 controls the interoperability of the support circuits 130, CPU 125, memory 135, and the I/O interface 150. The user interface module 160 contains instructions for the I/O interface 150 to interact with the operating system 140 such as for a graphical user interface (GUI). The voice communication module 145 may establish a communication session via cellular communication (CDMA, GSM, and the like).

The CPU 125 may comprise one or more commercially available microprocessors or microcontrollers that facilitate data processing and storage. The various support circuits 130 facilitate the operation of the CPU 125 and include one or more clock circuits, power supplies, cache, input/output circuits, and the like. The memory 135 comprises at least one of Read Only Memory (ROM), Random Access Memory (RAM), disk drive storage, optical storage, removable storage and/or the like.

The operating system (OS) 140 generally manages various computer resources (e.g., network resources, file processors, and/or the like). The operating system 140 is configured to execute operations on one or more hardware and/or software modules, such as Network Interface Cards (NICs), hard disks, virtualization layers, firewalls and/or the like. Examples of the operating system 140 may include, but are not limited to, LINUX, CITRIX, MAC OSX, BSD, UNIX, MICROSOFT WINDOWS, IOS, ANDROID and the like.

The automated load balancing modules 155 of participant device $105_{1-N}$ and/or 188 of proxy server 116 analyze information associated with each participant device $105_{1-N}$ to assign the participant device $105_{1-N}$ into one of a plurality of groups of participant devices based on at least one first heuristic (e.g., a coarse heuristic). The load balancing module 155, 188 may also designate, for each group of participant devices, a leader device based on at least one second fine heuristic (e.g., a fine heuristic) to coordinate teleconference session communications for the participant devices in the group. In some embodiments, the load balancing module 155, 188 may first designate each of the plurality of participant devices as one of a leader device or a follower device based on at least one first heuristic, and then assign each of the follower devices into one of a plurality of groups based on at least one second heuristic, and assigning a leader device to each group of follower devices.

As discussed above, in assigning devices to groups and designating them as leader/follower devices, the load balancing module 155, 188 may consider heuristics for each participant device $105_{1-N}$. Heuristics may include determinations/rules based on static properties that would not change during a conference session, such as for example, device type (e.g., personal computer, laptop, tablet, smartphone, and the like), bandwidth, memory size, processor type (e.g., 32-bit, 64-bit processor speed, threading capability, and the like), connection type (e.g., broadband, wireless, cellular), and operating system (e.g., CITRIX, MICROSOFT WINDOWS, APPLE IOS, and the like). Heuristics may also include determinations/rules based on dynamic properties that may change during a conference session. Dynamic properties may include connection quality (e.g., latency, jitter, etc.), network type (e.g., 4G or 3G), power source (e.g., battery or electrical outlet), location (e.g., participant device is operating on a train), and the like. For example, the AC port for an application programming interface (API) of a participant device $105_1$ may indicate a status change from a battery powered operation to a charging battery operation (e.g., the device was plugged into an electrical outlet). In such an example, the participant device $105_1$ is considered by the load balancing module 155, 188 to have greater power source stability, and therefore a more stable connection to the conference session over other participant devices $105_{N2-N}$ operating on battery power.

In some embodiments, the properties of other participant devices $105_{1-N}$ are shared or broadcast among the participant devices $105_{1-N}$ such that each participant device will self-identify as either a leader device or follower device based on the properties of the other devices. In other embodiments, the respective roles (as either leader or follower) may be initially assigned by the proxy server 116 and subsequently independently maintained by the individual devices. Further still are embodiments where the proxy server 116 controls all role assignments of leader and follow devices.

Profiles of specific users can be also used for prioritizing resource allocation of leaders and followers. For example, paid subscribers to a VoIP system may automatically have devices allocated more bandwidth from a designated leader device and allocated greater processing and bandwidth resources than non-paying subscribers.

The load balancing modules 155, 188 continually monitor the communication session and the device properties of the devices associate with the communication session. Thus, load balancing modules 155, 188 can dynamically redistribute or reorganize grouping of follower devices according to load demands of the conference session, and the dynamically changing properties of the participant devices $105_{1-N}$. Scenarios for dynamic redistribution may include participant devices $105_{1-N}$ joining or leaving the conference session. Alternative scenarios may also include specific participant devices $105_{1-N}$ requiring greater processing or bandwidth based on location or broadcast type. For example, a participant device may begin broadcasting a high definition presentation file that requires additional bandwidth and processing by leader devices.

As discussed above, each participant device $105_{1-N}$ may be designated as a leader or follower device. In some embodiments, a device may be identified as a follower device if it has not been designated as a leader device. For example, the first participant device $105_1$ may be a personal computer with a broadband connection while the second participant device $105_2$ may be a smartphone on a cellular connection. Thus, the first participant device $105_1$ may be designated a leader device because of greater processing power and connection stability, and the second participant device $105_2$ may be designated, or otherwise identified as, a follower device. The first participant device $105_1$, as a leader device, includes a media relay module 165 for relaying communication data from the conference session. In some embodiments, follower devices may also include a media relay module 165 that remains dormant unless the device is re-designated as a leader device. The media relay module 165 communicates data along duplexed channels for each follower device assigned to the leader device. The media relay module 165 also communicates data between other leader devices in the system 100 in a mesh configuration. In alternative embodiments, a single leader device or proxy server 116 can coordinate leader assignments and load re-balancing of resource allocation.

Figure 2:
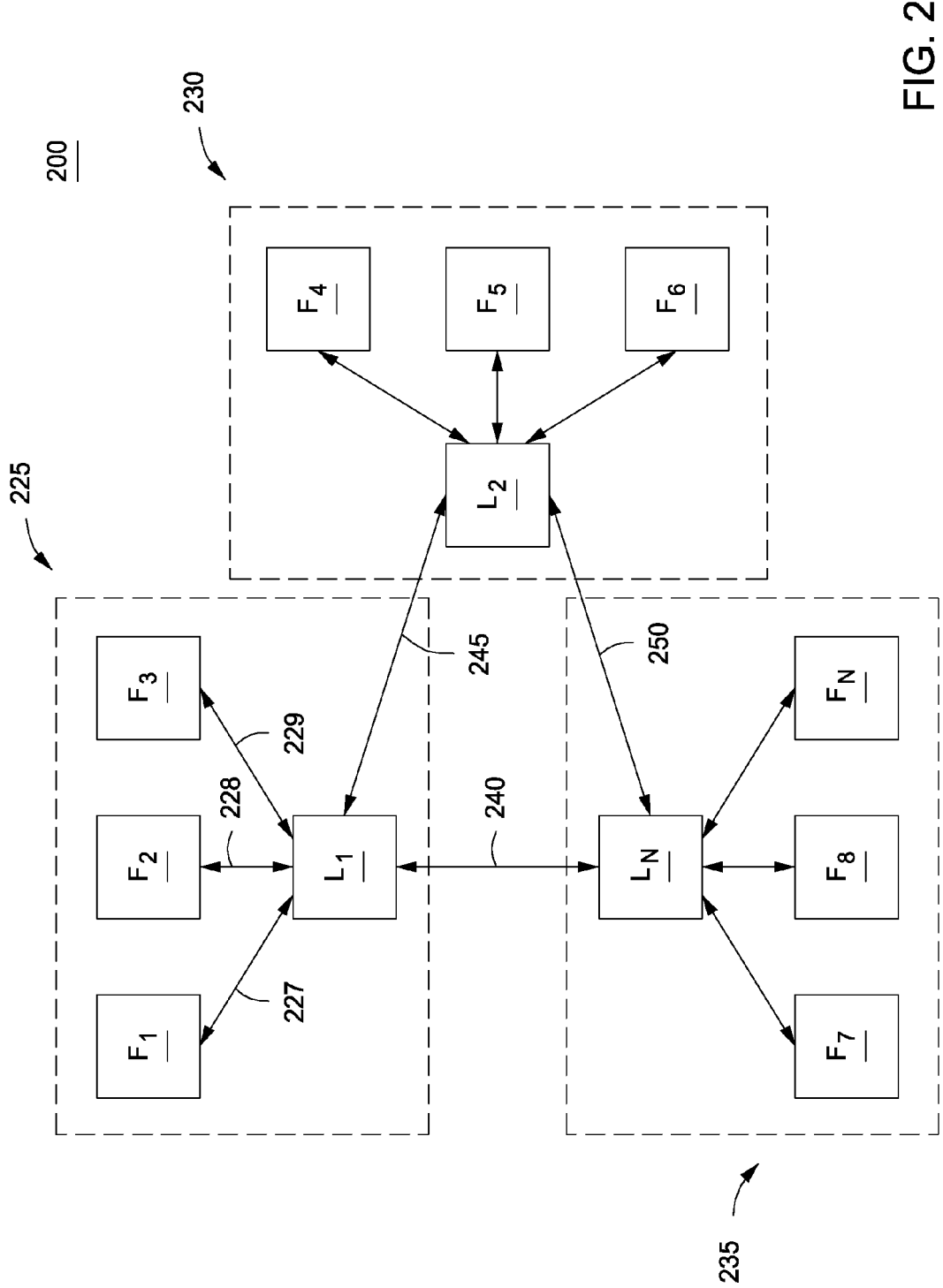
FIG. 2 is an exemplary diagram of groupings of participant devices in accordance with one or more embodiments of the present invention.

FIG. 2 is an exemplary diagram of grouping participant devices in accordance to one or more embodiments of the present invention. FIG. 2 depicts a balanced system that is a continuation of the system 100 in FIG. 1. FIG. 2 depicts load balancing of resources among the participant devices $105_{1-N}$ in the balanced system configuration 200.

In the balanced system configuration 200, the devices are separated into groups (225, 230, 235). One of the participant devices in each group is designated as a leader device ($L_1$, $L_2$, ... $L_N$) using the heuristics as discussed above. The remaining devices in each group are designated as, or otherwise identified as, follower devices ($F_1$, $F_2$, ... $F_N$). Each group includes at least leader device (e.g., $L_1$) coupled to multiple follower devices ($F_1$, $F_2$, $F_3$) via duplexed channels (227, 228, 229). The channels (227, 228, 229) allow bidirectional communication between followers ($F_1$, $F_2$, $F_3$) and the leader ($L_1$). The media relay modules 165 in the leader devices coordinate communication between followers (e.g., $F_1$, $F_2$, $F_3$) via the leader (e.g., $L_1$) via the channels (e.g., 227, 228, 229). An example of handshaking protocols for communication between followers ($F_1$, $F_2$, $F_3$) and the leader ($L_1$) may include MGCP or H.248 that may allow for more control over multi-part session flows.

The communication streams along channels (e.g., 227, 228, 229) within a group (e.g., 225, 230, 235) may be viewed as one level of communication. Communications between leader devices ($L_1$, $L_2$, ... $L_N$) may be viewed as a second level of communication. During a conference session, these two levels of communications are mixed. The mixing of the two levels reduces the number of requisite channels among the participant devices $105_{1-N}$.

For example, in some embodiments, video communication mixing may occur within group 225 including follower devices $F_1$, $F_2$, F3 connected to leader device $L_1$. Each of the three participant devices $F_1$, $F_2$, F3 has a captured video stream from a camera. Each stream is sent to the leader $L_1$. The leader device $L_1$ now has three different input streams to combine. The leader device $L_1$ first creates a blank surface, approximately the average dimensional size of all the input sizes of the video streams. Alternatively, the blank surfaces may correspond to a predetermined size for a given participant device. Secondly, the leader device $L_1$ ensures all inputs (including that from the leader device $L_1$) are viewable on the blank surface and fits the streams to the blank surface (e.g., scaling would be applied, and cropping) for a first level of communication. The leader device $L_1$ also coordinates with other leader devices ($L_2$ and $L_N$) in a second level of communication, to further integrate filling the blank surface with all streams from all participant devices. The leader devices $L_1$, $L_2$, and $L_N$ then send the filled surface to all participant devices for viewing and is also viewed from the leader devices $L_1$, $L_2$, and $L_N$. In other embodiments, only some of the participants are displayed. For example, in some embodiments, only the video from participant(s) that are speaking are viewable in the foreground, while the video from other participants is not displayed or shown as a static image in the background.

Continuing this example, since participant devices (e.g., $F_1$, $F_2$, $F_3$) will receive a flattened buffer, alternative embodiments may further alter the received filled surface from the leader device $L_1$. By sending metadata about offsets of sub-frames in the output frame (similarly to the HTML <map> tag), the individual participant devices client could "cut" out the different frames and re-arrange them in some other way (such as when a particular device was rotated from landscape to portrait mode). Localized frame modification could be done for example with OpenGL.

In this example, packet configuration is of basic RTP protocol for data transport. If mapping using the RTP is necessary, this is achieved through the Extension header of the RTP packet. Alternatively mapping can be done in the APP section of the RTCP protocol (which accompanies the RTP).

In some embodiments, prior to performing the load-balancing methods discussed herein to implement a multi-level configuration including leader and follower devices, the proxy server 116 may sample the latency of each of the participant devices $105_N$. In some embodiments, the latency may be determined by pinging each of the participant devices $105_N$. Based on the response, the proxy server 116 may determine whether the leader and follower topology can provide lowered latency and load balancing. If determined that a multi-level configuration would lead to lower latency, the proxy server 116 communicates to the automated load balancing module 155 of each participant device $105_N$ to switch to a leader and follower configuration. However, if latency would be the same or worse (based on previous recorded latencies with similar devices in the two level configuration), the proxy server 116 remains in the default single level configuration. The single level configuration being one with the centralized host configuration (all participants connected via a central server) or mesh or peer-to-peer configuration (all participant devices connected to one another).

In some embodiments, more than two levels may be implemented when a leader device becomes overloaded or when a group reaches a predefined number of participants. Sub-groups may be formed within each group using the same heuristics used to form each parent group, thereby creating a hierarchical topology within the group. To form the hierarchy, at least some of follower devices in the parent group are designated as sub-group leaders. The sub-group leaders may all connect to the parent group leader device or proxy server 116 to coordinate the conference communications. The designation of a sub-group leader may be determined by at least one heuristic as applied among the follower devices in the group. In addition, the hierarchical topology may be adaptively expanded or contracted with resource balancing demands and ultimately can revert back to the two level topology when the leader device regains sufficient resources to process conferencing data for the group. The decision to maintain or revert away from the hierarchical topology is determined by which topology has a lower latency for all devices in the group. Alternatively, an overloaded leader device may have assigned follower devices split to another group with a respective leader device.

Various algorithms may be used to determine the number of groups that will be used for the communication session. In some embodiments, the number of groups is determined based on the number of participant devices. For example, the number of groups M may be determined by taking the square root of the number of participant devices $105_{1-N}$. For example, with five participant devices there would be two groups, with 50 participant devices there would be seven groups, and the like. Each group would include one leader device. Alternative formulas may be used in determining the number groups such as clustering algorithms (e.g., density-based spatial clustering (DBSCAN) or ordering points to identify the clustering structure (OPTICS)) in addition to the applied heuristics discussed above. If there are two or less participant devices $105_{1-N}$, balancing or grouping may not be necessary.

Alternatively, grouping may be based on the designation heuristics discussed above, as well as other factors that would decrease latency. In some embodiments, such factors may be stored in user profiles or determined by geography. For example, family members or members located in the same geographic region may be in the same group. Thus, in a conference call between participants in France, Ireland, and India, three groups may be formed and participants from each country are assigned to respective groups. By structuring using locality, there is a reduction in consuming processing resources (e.g., via up-sampling and down-sampling) as the same data stream may be commonly sent to the follower devices of a given group. Telemetry of previous conference sessions from the participant devices may be stored and used as a heuristic for future calls to predict latency and other network variations.

Leader devices ($L_1, L_2, \ldots L_N$) are then coupled together via duplexed channels (240, 245, 250) to complete the conference session among all devices ($L_1, L_2, \ldots L_N; F_1, F_2, \ldots F_N$). Thus, the conference session includes a balanced resource load distributed among the leader devices ($L_1, L_2, \ldots L_N$). Communication between groups uses signaling protocols that may be on top of TCP/UDP such as REST API over HTTP. Alternatively, communication may be facilitated by the introduction of extensions over SIP. Other examples of signaling protocols include H.323 (IP), MGCP (IP-PSTN Gateway) and SS7 (Pure PSTN).

In other embodiments, the duplexed channels (240, 245, 250) between leader devices may be routed through a centralized proxy server 116. In such an embodiment, the leader devices ($L_1, L_2, \ldots L_N$) still effectively reduce the amount of processing required by the central network as the number of connections or channels necessary is equal to the number of leader devices ($L_1, L_2, \ldots L_N$) rather than the total number of participants.

Figure 3A:
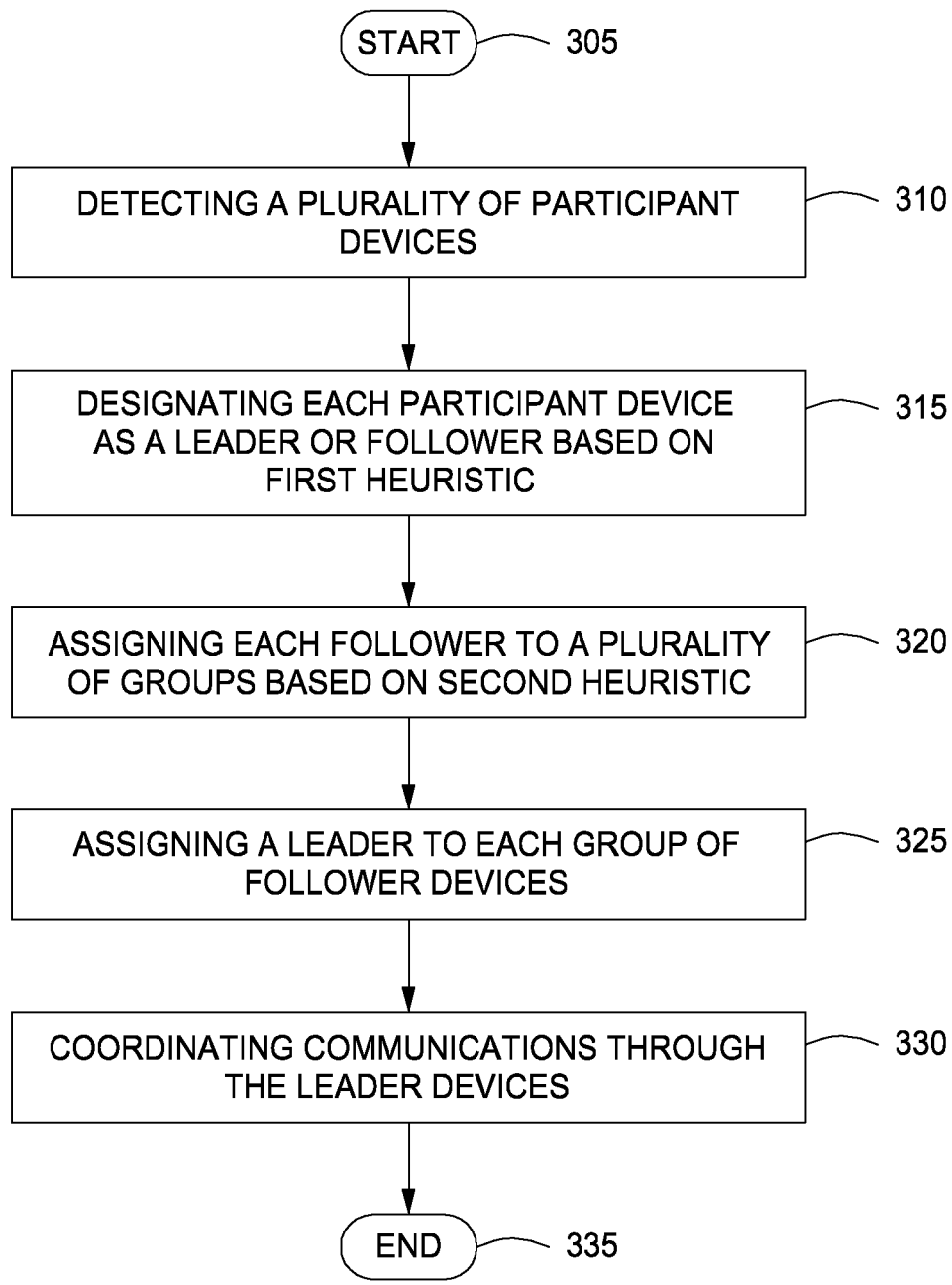
FIG. 3A is an exemplary flowchart of a first method for grouping participant devices using the devices depicted in FIG. 1 in accordance with one or more embodiments of the present invention.
Figure 3B:
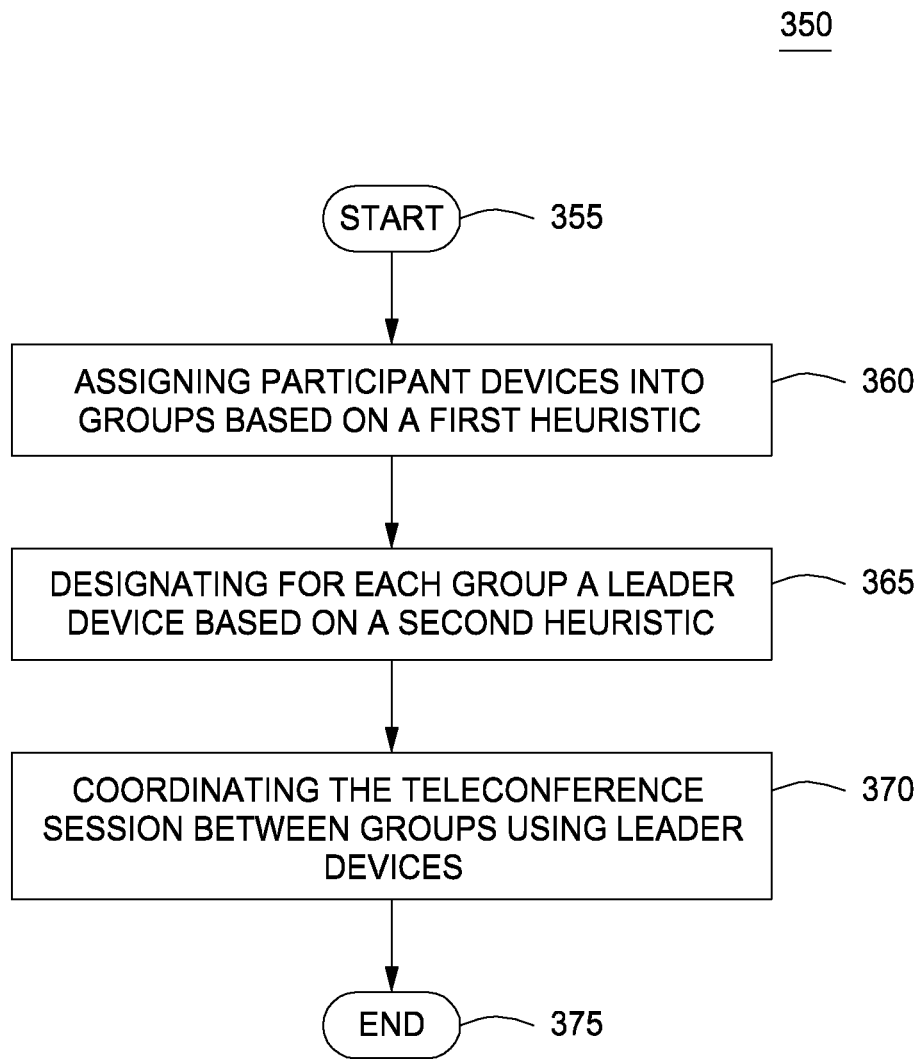
FIG. 3B is an exemplary flowchart of a second method for grouping participant devices using the devices depicted in FIG. 1 in accordance to one or more embodiments of the present invention.

FIGS. 3A and 3B are exemplary flowcharts of methods 300 and 350, respectively, for implementing resource load balancing in a conferencing sessions in accordance to one or more embodiments of the present invention. Specifically, method 300 first determines leader devices and then assigns leaders to groups, while method 350 first assigns participant devices to groups and designates one or more of the participant devices in each group as a leader device. In some embodiments, a determination is made as to which method is preferable for a given situation based on information received about each participant device. For example, in situations where participant devices are geographically dispersed, method 350 may be used to first assign participants into groups based on geographical proximity, and then designate leaders within each group. In other situations where the participant devices are all co-located (e.g., within the same building complex), method 300 may be used to designate leader devices as those participant devices having broadband connections and/or steady power sources, and subsequently assigned the leader devices to groups of follower devices. An algorithm analyzing applicable heuristics may be chosen to determine whether to apply method 300 or method 350 to achieve the desired load balancing. Methods 300 and 350 are discussed below in detail Method 300 achieves load balancing by role assignments for at least one applicable heuristic among a plurality of participant devices $105_N$. In some embodiments, the method 300 is performed by the automated load balancing module 155 as well as the media relay module 165 of the one or more participant devices $105_{1-N}$. In other embodiments, the method 300 is performed by the automated load balancing module 155 and media relay 118. Alternatively, portions of method 300 may be performed by both load balancing module 155 and load balancing module 188 and either or both media relays 165 and 118. The method 300 begins after an established conference session.

The method 300 begins at step 305 and continues to step 310 to detect a plurality of participant devices in the teleconference session on the proxy server 116. The method 300 continues to step 315 to designate each of the plurality of participant devices $105_N$ as one of a leader device or a follower device based on at least one heuristic. For example, leader devices may be the participant devices with the greatest bandwidth connection. The number of leader devices to be used directly corresponds to the number of groups determined via a grouping algorithm. Continuing the example, if the grouping algorithm is simply the square root of the number of participants, and there are 25 participants, the five participant devices with the highest bandwidth connections will be designated as leader devices. In some embodiments, the automated load balancing module 155 may determine the leader devices. The remaining devices in some embodiments, may be self-designated as follower devices ($F_1, F_2, F_3$) on each participant device $105_{1-N}$ upon comparison with heuristics received from the other participant devices.

Next, at step 320, assignment of each follower device is made to one of a plurality of groups based on at least one second heuristic. As mentioned above, the number of the plurality of groups necessary is determined using grouping formulas or heuristics as described above. Continuing the example, the number of groups can be based on the square root of the number of participant devices, and then whether the participant devices are originating from the same countries, and the like.

The method 300 continues to step 325 where the leader devices are assigned to respective groups of follower devices. In some embodiments, leader devices may be assigned to groups based on one or more device properties that it shares with follower devices in the group (e.g., the follower devices and assigned leader device are geographically proximate each other). In alternative embodiments, assignment may be dynamic via a trial and error basis to determine which leader device yields the lowest latency for each group.

The method 300 then continues to step 330 to coordinate for each group, teleconference session communications of all participant devices in the group and from each leader device of other groups to facilitate the teleconference session among the plurality of participant devices. The follower devices are connected via duplexed channels or channels allowing bi-directional synchronized communication between follower devices and the leader device within each group for the first level of communication. The leader devices are communicatively coupled with bi-directional communication streams for a second level of communication. By connecting all leader devices, groups are interconnected and accordingly, all participant devices are logically interconnected. The media relay modules 165 in the leader devices relay communication data between the respective leader and follower devices and mix the two communication levels. The method 300 then ends at step 335.

FIG. 3B is an exemplary flowchart of a method 350 for grouping the participant devices using the devices depicted in FIG. 1 in accordance to one or more embodiments of the present invention. Specifically, the method 350 achieves load balancing by role assignments by grouping participant devices $105_N$ using a heuristic prior to role assignment. In some embodiments, the method 350 is performed by the automated load balancing module 155 as well as the media relay module 165 of the one or more participant devices $105_{1-N}$. In other embodiments, the method 350 is performed by the automated load balancing module 188 and media relay 118. Alternatively, portions of method 350 may be performed by both load balancing module 155 and load balancing module 188 and either or both media relays 165 and 118. The method 350 begins after an established conference session.

The method 350 begins at step 355 and continues to step 360. At step 360, each of the plurality of participant devices $105_N$ are assigned into one of a plurality of groups of participant devices based on at least one first heuristic. For example, in a conference session between participant devices $105_N$ in Europe and Australia, participant devices joining from Europe are associated as one group and participant devices joining from Australia are associated as another group.

Next at step 365, for each group of participant devices, a leader device based on at least one second heuristic is designated to coordinate teleconference session communications for the participant devices in the assigned group. Continuing the aforementioned example, a participant device $105_1$ in Sydney broadcasting a status as a desktop PC with a broadband connection when all other devices in the Australian group are mobile devices is designated the leader device for the Australian group. Similarly, a participant device $105_2$ in Paris broadcasting a status as having a 64-bit processor is designated a leader device when all other devices in the European group use 32-bit processors.

At step 370, the teleconference session communications are coordinated by each leader device to facilitate the teleconference session among the plurality of participant devices $105_N$. The follower devices are connected via duplexed channels or channels allowing bi-directional synchronized communication between follower devices and the leader device within each group for a first level of communication. The leader devices are communicatively coupled with bi-directional communication streams for a second level of communication. Continuing the example, the follower devices in the Australian group are each commonly communicatively coupled via duplexed channels to the leader device $105_1$ in Sydney. Similarly, the follower devices in Europe are communicatively coupled via the leader device $105_2$ in Paris. Then, the leader devices $105_1$ and $105_2$ are communicatively coupled via a duplexed channel carrying communications between the respective groups.

By connecting all leader devices, groups are interconnected and accordingly, all participant devices are logically interconnected. The media relay modules 165 relay communication data between the respective leader and follower devices and mix the two communication levels. The method 350 then ends at step 375.

Figure 4:
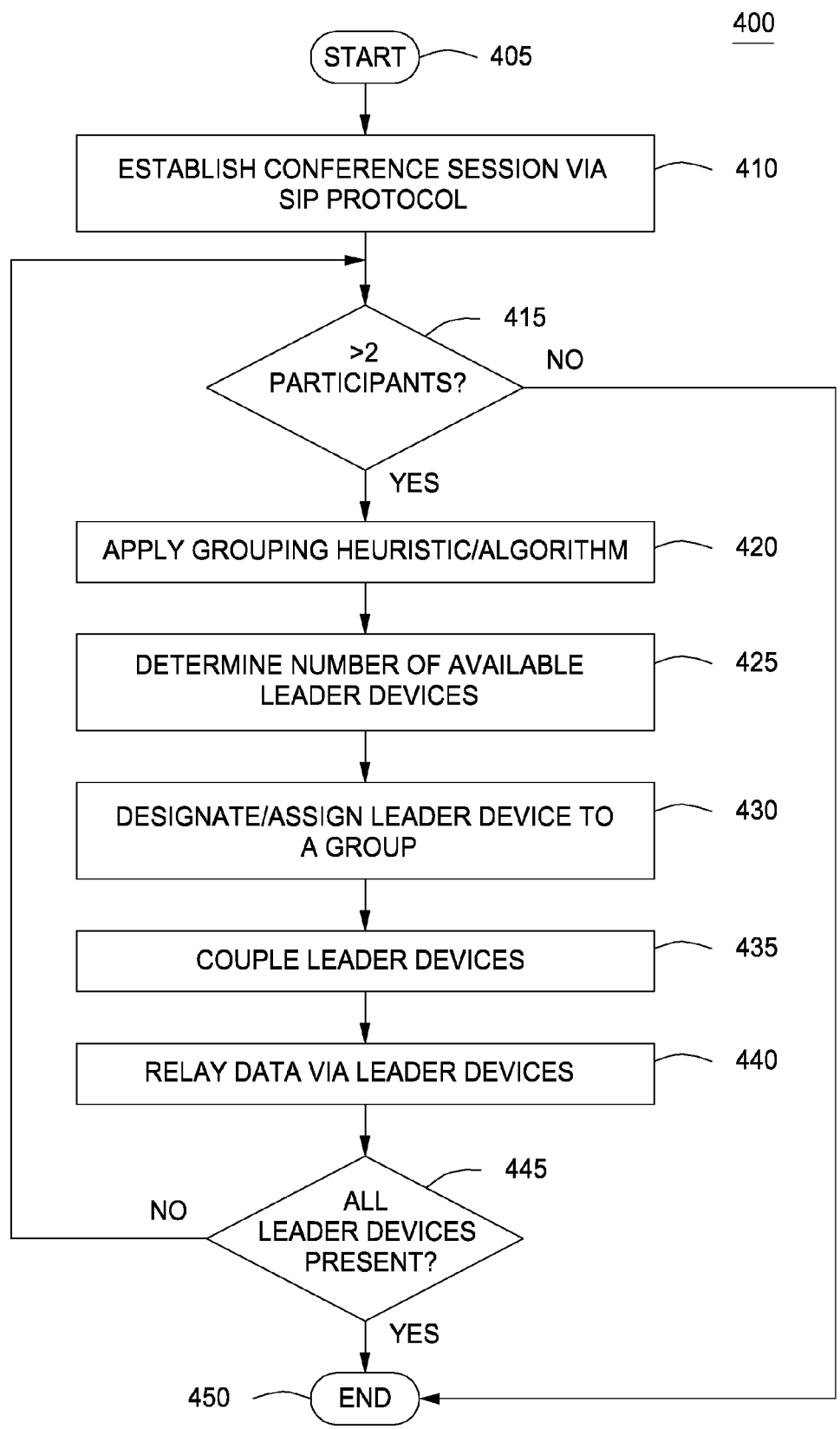
FIG. 4 is an exemplary flowchart of a method for rebalancing a grouping of participant devices in accordance with one or more embodiments of the present invention.

FIG. 4 is an exemplary flowchart of a method 400 for rebalancing the grouping of the participant devices using the devices depicted in FIG. 1 in accordance to one or more embodiments of the present invention. In some embodiments, the method 400 is performed by the automated load balancing module 155 as well as the media relay module 165 of the one or more participant devices $105_{1-N}$. In other embodiments, the method 400 is performed by the automated load balancing module 188 and media relay 118. Alternatively, portions of method 400 may be performed by both load balancing module 155 and load balancing module 188 and either or both media relays 165 and 118.

The method 400 begins at step 405 and continues to step 410 where a conference session is established using SIP or, in some embodiments, an existing conference session is detected. The method 400 continues to step 415 to determine whether more than two participant devices are in the conference session. If at step 415, a determination is made that there are two or less participant devices, resource balancing is not necessary, and the method 400 ends at step 450.

If however, if it is determined that there are more than 2 participants, the method 400 continues to step 420. At step 420, a grouping heuristic and/or algorithms discussed above is applied to ensure low latency response. Low latency response shall mean that which is not perceptible to the users of the participant devices $105_{1-N}$ (e.g., 100 ms). The identified groups of follower devices are thus determined by the heuristics and algorithms. The method 400 continues to step 425.

At step 425 where the number of available leader devices is determined among the participant devices $105_{1-N}$. Next, at step 430, leader devices are designated/assigned to an appropriate group as determined in step 420. An appropriate group would be one of the same heuristic or otherwise results in the lowest latency. For example, a leader device may be geographically located in the same country as corresponding follower devices in the assigned group.

The method 400 continues to step 435 where leader devices are communicatively coupled to follower devices within the assigned group as well as leader devices of other groups. Next, at step 440, conference session data from the follower devices are communicated to the respectively assigned leader devices for communication among all participant devices $105_N$. At step 445, it is determined whether all leader devices are still presently connected to the conference session.

If automated load balancing module 155 determines all leaders are present, the method ends at step 450. Alternatively, a central proxy server may coordinate the presence of connected leader devices. However, if a leader device drops or disconnects from the conference session, the method 400 reverts back to step 415 to ensure load balancing is necessary.

Alternatively, step 445 may also include changing the rank or role of leader devices that have status changes that could affect conference session stability (e.g., switching from a high bandwidth to lower bandwidth connection or switching from power line connection to battery power). This status change may be broadcasted to update all participant devices for subsequent heuristic evaluation, and the method reverts back to step 415. The method 400 then ends at step 450.

Figure 5:
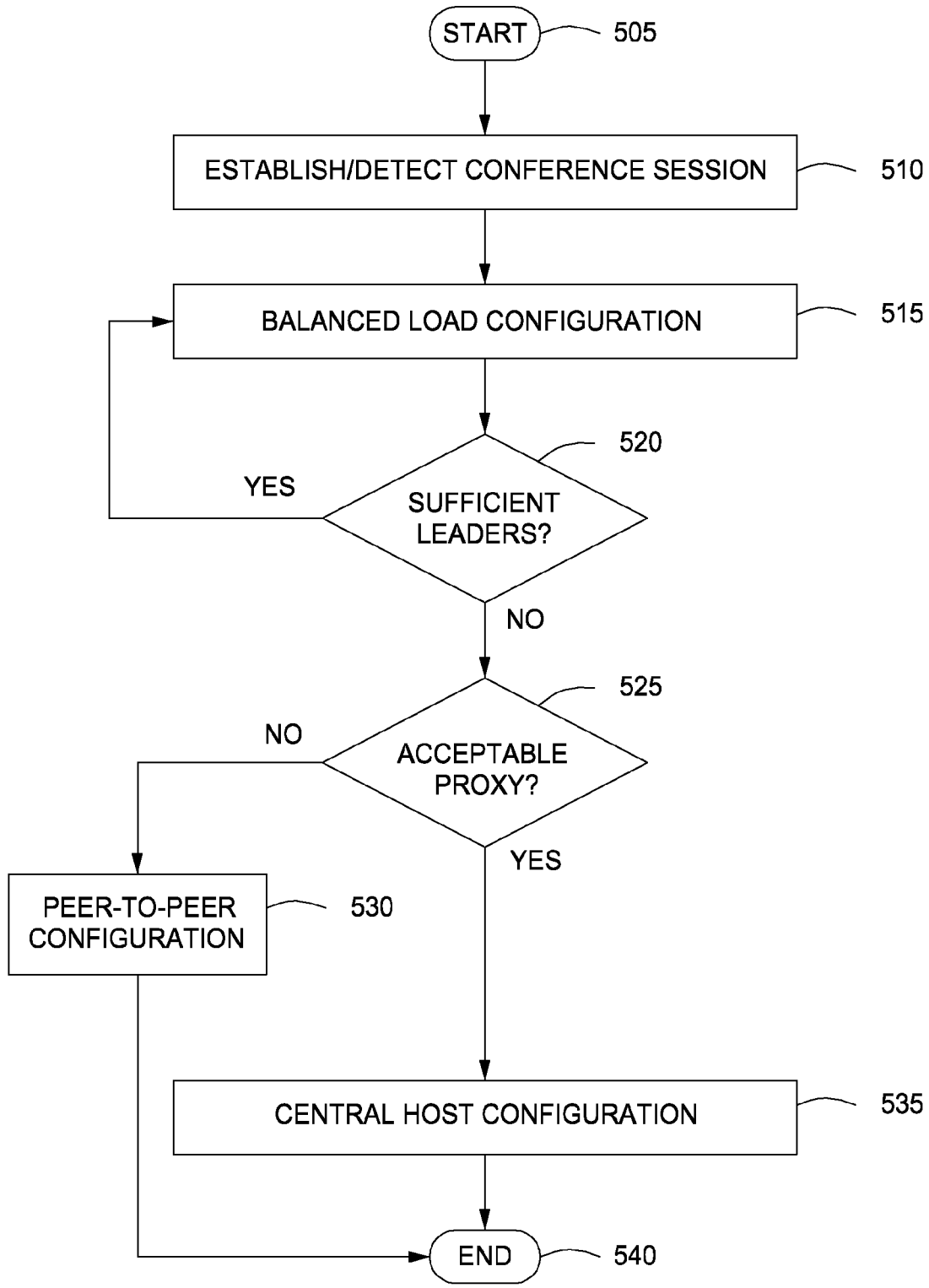
FIG. 5 is an exemplary flowchart of a method for grouping participant devices when resource balancing is unavailable in accordance with one or more embodiments of the present invention.

FIG. 5 is an exemplary flowchart of a method 500 for grouping the participant devices when automated resourcing balancing is unavailable in accordance to one or more embodiments of the present invention. Resource balancing may not be available in situations where there are insufficient leader devices, or devices capable of being a leader device, to support the multi-level leader/follower topology. In some embodiments, the method 500 is performed by the automated load balancing module 155 as well as the media relay module 165 of the one or more participant devices $105_{1-N}$. In other embodiments, the method 500 is performed by the automated load balancing module 188 and media relay 118. Alternatively, portions of method 500 may be performed by both load balancing module 155 and load balancing module 188 and either or both media relays 165 and 118.

The method 500 begins at step 505 and continues to step 510 where either a conference session is detected or established. Next, at step 515, the system attempts to implement the resource load balancing of methods 300, 350 or 400 described above. At 520, it is determined whether a sufficient number of leader devices are detected that are capable of supporting the conference session in the balanced load configuration. For example, a sufficient number of leader devices capable of supporting the conference session would include a leader device for each group determined such that all participant devices $105_N$ can participate on the conference call at a desired minimum quality of service (i.e., low latency, low jitter, and the like). If a sufficient number of leader devices are present to maintain a balanced load configuration, the method 500 reverts back to step 515 to continue operation in the balanced resource load methods 300, 350 or 400. However, if an insufficient number of leader devices to support a balanced load configuration are determined in the conference session, the method 500 continues to step 525. At step 525, a determination is made of whether a host proxy server is available with an acceptable minimum quality of service (i.e., low latency, low jitter, and the like). In some embodiments, an acceptable minimum quality of service is one where there is substantially no perceivable delay for the participant devices in the conference session. If an acceptable proxy server is available, the method continues to step 535 where the conference session is managed using a central host configuration such that all participant devices $105_{1-N}$ are directly connected to the network 115. The method 500 then ends at step 540.

Referring back to step 525, if the quality of service is not determined to be acceptable, the method 500 continues to step 530. At step 530, the conference session is managed/established as a peer-to-peer configuration wherein all participant devices are communicatively coupled together. The method 500 then ends at step 540.

A similar method may occur to that of method 500 should the conference session experience a system wide crash. In such an embodiment, the conference session is converted to a traditional peer to peer connection or central host server among all participant devices $105_{1-N}$ as coordinated by either a central proxy server 116 or individual participant devices $105_{1-N}$.

Figure 6:
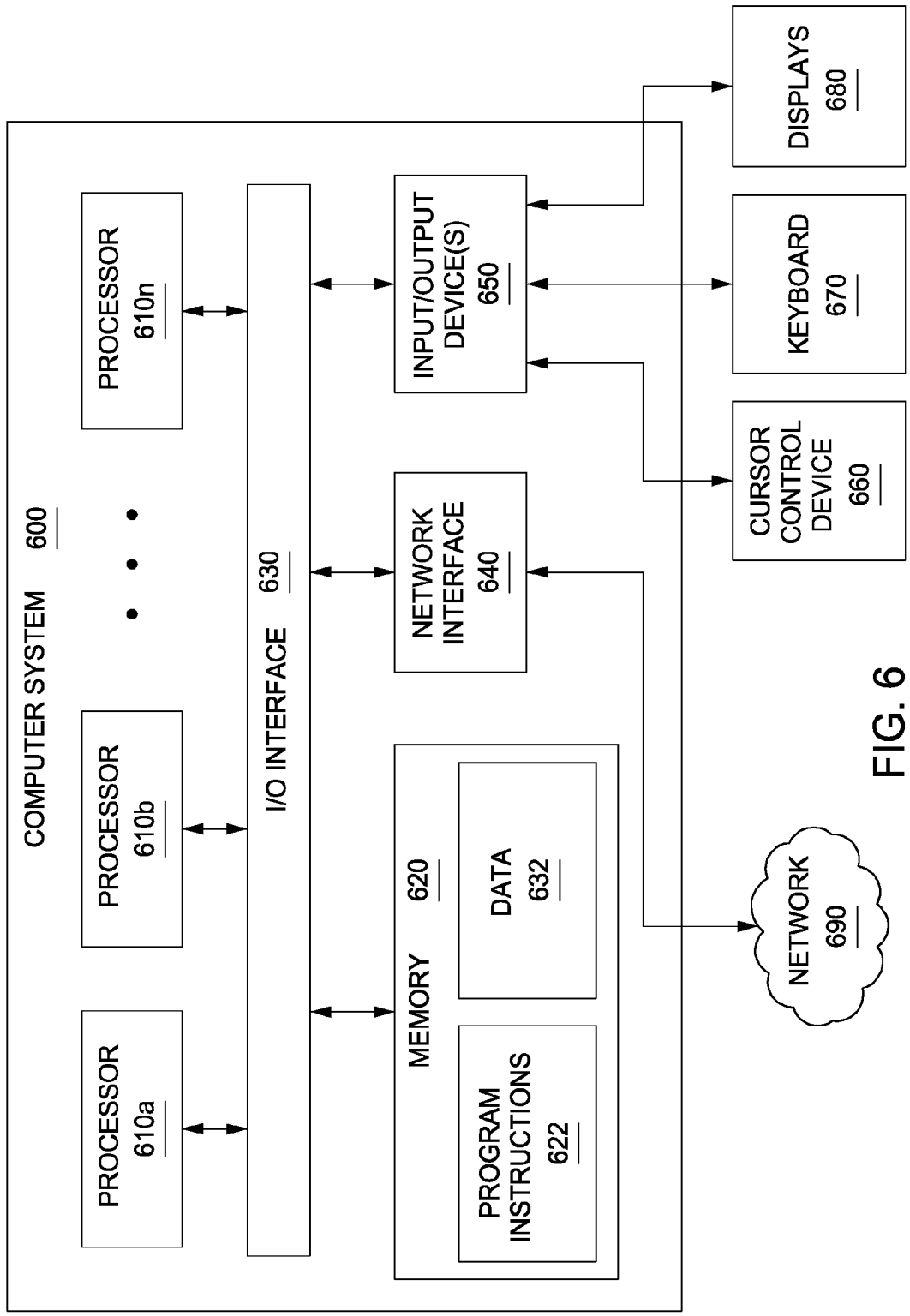
FIG. 6 is an exemplary diagram of a computer system for grouping participant devices in accordance with one or more embodiments of the present invention.

FIG. 6 is an exemplary diagram of a computer system 600 for grouping participant devices in accordance to one or more embodiments of the present invention. The computer system 600 includes substantially similar structure comprising servers or electronic devices in the aforementioned embodiments.

Various embodiments of methods and system authenticating users for communication sessions, as described herein, may be executed on one or more computer systems, which may interact with various other devices. One such computer system is computer system 600 illustrated by FIG. 6, which may in various embodiments implement any of the elements or functionality illustrated in FIGS. 1-5. In various embodiments, computer system 600 may be configured to implement methods described above. The computer system 600 may be used to implement any other system, device, element, functionality or method of the above-described embodiments. In the illustrated embodiments, computer system 600 may be configured to implement methods 300, 400, and 500 as processor-executable executable program instructions 622 (e.g., program instructions executable by processor(s) 610) in various embodiments.

In the illustrated embodiment, computer system 600 includes one or more processors 610a-610n coupled to a system memory 620 via an input/output (I/O) interface 630. Computer system 600 further includes a network interface 640 coupled to I/O interface 630, and one or more input/output devices 660, such as cursor control device 660, keyboard 670, and display(s) 680. In some embodiments, the keyboard 670 may be a touchscreen input device.

In various embodiments, any of the components may be utilized by the system to authenticate a user as described above. In various embodiments, a user interface may be generated and displayed on display 680. In some cases, it is contemplated that embodiments may be implemented using a single instance of computer system 600, while in other embodiments multiple such systems, or multiple nodes making up computer system 600, may be configured to host different portions or instances of various embodiments. For example, in one embodiment some elements may be implemented via one or more nodes of computer system 600 that are distinct from those nodes implementing other elements. In another example, multiple nodes may implement computer system 600 in a distributed manner.

In different embodiments, computer system 600 may be any of various types of devices, including, but not limited to, personal computer systems, mainframe computer systems, handheld computers, workstations, network computers, application servers, storage devices, a peripheral devices such as a switch, modem, router, or in general any type of computing or electronic device.

In various embodiments, computer system 600 may be a uniprocessor system including one processor 610, or a multiprocessor system including several processors 610

(e.g., two, four, eight, or another suitable number). Processors 610 may be any suitable processor capable of executing instructions. For example, in various embodiments processors 610 may be general-purpose or embedded processors implementing any of a variety of instruction set architectures (ISAs). In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 620. In other embodiments, program instructions and/or data may be received, sent or stored upon different types of computer-accessible media or on similar media separate from system memory 620 or computer system 600.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices attached to a network (e.g., network 690), such as one or more external systems or between nodes of computer system 600. In various embodiments, network 690 may include one or more networks including but not limited to Local Area Networks (LANs) (e.g., an Ethernet or corporate network), Wide Area Networks (WANs) (e.g., the Internet), wireless data networks, cellular networks, Wi-Fi, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display devices, keyboards, keypads, cameras, touchpads, touchscreens, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

In some embodiments, the illustrated computer system may implement any of the methods described above, such as the methods illustrated by the flowchart of FIGS. 3, 4, and 5. In other embodiments, different elements and data may be included.

Those skilled in the art will appreciate that computer system 600 is merely illustrative and is not intended to limit the scope of embodiments. In particular, the computer system and devices may include any combination of hardware or software that can perform the indicated functions of various embodiments, including computers, network devices, Internet appliances, smartphones, tablets, PDAs, wireless phones, pagers, and the like. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method for resource load balancing of a teleconference session including a plurality of participant devices, comprising:
    assigning each of the plurality of participant devices into one of a plurality of groups of participant devices based on at least one first heuristic;
    designating, for each group of participant devices, a leader device based on at least one second heuristic to coordinate teleconference session communications for the participant devices in the group;
    coordinating the teleconference session communications of each leader device to facilitate the teleconference session among the plurality of participant devices; and
    dynamically modifying an assignment of at least one of the plurality of participant devices or a designation of at least one of the leader devices in response to a change in at least one of the first heuristic and the second heuristic.

2. The method of claim 1, wherein the leader devices of each group are communicatively coupled to all participant devices within their assigned group.

3. The method of claim 2, wherein the leader devices of each group are communicatively coupled to each other to facilitate the teleconference session.

4. The method of claim 3, wherein the leader devices of each group are communicatively coupled to each other via a network proxy server.

5. The method of claim 3, wherein each leader device is communicatively coupled to the participant devices within their assigned group and to other leader devices via duplex communication channels.

6. The method of claim 1, wherein the at least one first heuristic is at least one of a device type, device model, device characteristic, broadband connection type, bandwidth availability to the device, device locality, or a user profile associated with the participant device.

7. The method of claim 1, wherein the at least one second heuristic is at least one of a device type, device model, device characteristic, broadband connection type, bandwidth availability to the device, device locality, or a user profile associated with the participant device.

8. The method of claim 1, wherein the at least one second heuristic is information regarding a power source of each participant device.

9. The method of claim 1, wherein determining a grouping number among the plurality of groups is a function of a total number of participant devices in the teleconference session.

10. The method of claim 1, wherein re-designation of one or more of the leader devices in the teleconference session occurs when a participant device joins or leaves the teleconference session.

11. The method of claim 1, further comprising:
    converting the teleconference session to (a) a central host server configuration or (b) peer-to-peer connection configuration, wherein all participant devices are communicatively coupled together, for hosting the teleconference session, when a number of leader devices participating in the teleconference session is less than the number of groups.

12. A method for resource load balancing in a conferencing platform comprising:
    detecting a plurality of participant devices in a teleconference session;
    designating each of the plurality of participant devices as one of a leader device or a follower device based on at least one first heuristic;
    assigning each of the follower devices into one of a plurality of groups based on at least one second heuristic, wherein the at least one second heuristic is at least one of a device type, device model, or power source of the follower device, and assigning a leader device to each group of follower devices;
    coordinating, for each group, teleconference session communications of all participant devices in the group and from each leader device of other groups to facilitate the teleconference session among the plurality of participant devices; and
    dynamically modifying an assignment of at least one of the plurality of participant devices or a designation of at least one of the leader devices in response to a change in at least one of the first heuristic and the second heuristic.

13. The method of claim 12, wherein the leader devices of each group are communicatively coupled to all participant devices within their assigned group.

14. The method of claim 13, wherein the leader devices of each group are communicatively coupled to each other to facilitate the teleconference session.

15. The method of claim 14, wherein the leader devices of each group are communicatively coupled to each other via a network proxy server.

16. The method of claim 15, wherein each leader device is communicatively coupled to the participant devices within their assigned group and to other leader devices via duplex communication channels.

17. The method of claim 12, wherein the at least one first heuristic is at least one of a device type, device model, device characteristic, broadband connection type, bandwidth availability to the device, device locality, or a user profile associated with the participant device.

18. The method of claim 12, wherein the at least one second heuristic is at least one of a device characteristic, broadband connection type, bandwidth availability to the device, device locality, or a user profile associated with the participant device.

19. A system for resource load balancing of a teleconference session including a plurality of participant devices, comprising:
    a plurality of groups of participant devices, wherein each participant device is assigned into one of the plurality of groups of participant devices based on at least one first heuristic, and wherein each group of participant devices includes:

a plurality of follower devices, and a leader device communicatively coupled to each of the plurality of follower devices in the group, wherein the leader device is designated for the plurality of follower devices based on at least one second heuristic, and wherein the leader device is configured to coordinate teleconference session communications for all the participant devices in the group; and a proxy server communicatively coupled to each leader device and configured to coordinate the teleconference session communications of each leader device to facilitate the teleconference session among the plurality of participant devices and to dynamically modify an assignment of at least one of the plurality of participant devices or a designation of at least one of the leader devices in response to a change in at least one of the first heuristic and the second heuristic.

\* \* \* \* \*